United States Patent [19]

Newhouse

[11] Patent Number: 4,881,451
[45] Date of Patent: Nov. 21, 1989

[54] TANDEM VACUUM BOOSTER AND DIAPHRAM FOR SAME

[75] Inventor: Delvert W. Newhouse, Dayton, Ohio

[73] Assignee: General Motors Corporation, Detroit, Mich.

[21] Appl. No.: 92,634

[22] Filed: Sep. 3, 1987

[51] Int. Cl.⁴ .............................................. F01B 19/00
[52] U.S. Cl. ........................................ 92/48; 92/97;
    92/980; 92/98 R; 92/103 SD; 91/376 R
[58] Field of Search ............. 92/48, 49, 50, 97, 98 D,
    92/98 R, 99, 103 SD, 64; 91/376 R, 369 A, 369
    B, 189 R; 60/547.1

[56] References Cited

U.S. PATENT DOCUMENTS

| | | | |
|---|---|---|---|
| 2,208,539 | 7/1940 | Brown | 92/48 |
| 3,083,698 | 4/1963 | Price et al. | 91/376 R |
| 3,096,689 | 7/1963 | Kytta | 92/48 |
| 3,388,635 | 6/1968 | Hager | 92/48 |
| 3,650,181 | 3/1972 | Parr | 92/97 |

Primary Examiner—Robert E. Garrett
Assistant Examiner—Thomas Denion
Attorney, Agent, or Firm—D. D. McGraw

[57] ABSTRACT

A tandem diaphragm vacuum booster in which both diaphragm and the bead seals are made of a single rubber-like molding.

3 Claims, 1 Drawing Sheet

TANDEM VACUUM BOOSTER AND DIAPHRAM FOR SAME

The invention relates to a tandem vacuum booster and more particularly to one in which the power wall diaphragms thereof are provided as a single flexible diaphragm member.

Tandem vacuum boosters are well known, having been used in automotive vehicles for many years. Essentially they comprise a single piston which is axially movable by differential pressures acting on diaphragm power walls separating the booster housing into two vacuum chambers and two variable pressure chambers. The valve mechanism for the booster will admit atmospheric air pressure into the variable pressure chambers, which are normally at vacuum pressure when the booster is in the released position, to actuate the booster. Such tandem vacuum boosters have been commonly provided with separate rubber-like diaphragms, each of which has an inner peripheral portion secured to the piston and an outer peripheral portion secured to the booster housing, with a divider wall therebetween which is appropriately sealed to separate a vacuum chamber for one diaphragm and the variable pressure chamber for the other diaphragm. This arrangement requires several peripheral sealing points at the outer periphery, and in particular requires one for each of the two diaphragms as well as one for the divider wall, all sealed in relation to the booster housing. A sealing arrangement is also provided for the area between the two booster housing sections. This arrangement also requires greater assembly time than does the arrangement embodying the invention using a single flexible diaphragm member to provide both diaphragms and various sealing arrangements.

In some instances, passage means connecting the two vacuum pressure chambers and the two variable pressure chambers may be provided within the power piston, the two passages being fluidly interconnected during the released position of the booster but disconnected by valve action when the booster is to be actuated. In other instances appropriate passages accomplishing the same results for one pair of chambers may be provided through the outer peripheral area adjacent the booster housing at its juncture of the two housing sections or at its maximum diameter.

By use of the invention herein disclosed and claimed, the single flexible diaphragm member provides all of the sealing action required between the various diaphragm member sections and the booster housing as well as between the booster housing the divider wall. It also provides for a less expensive manufacturing operation since a single flexible diaphragm member may be molded as easily as either one of the two diaphragm members previously used, once the mold has been constructed and placed in production. This results in less parts to be handled during the entire manufacturing and assembly process.

IN THE DRAWING

Figure 1:
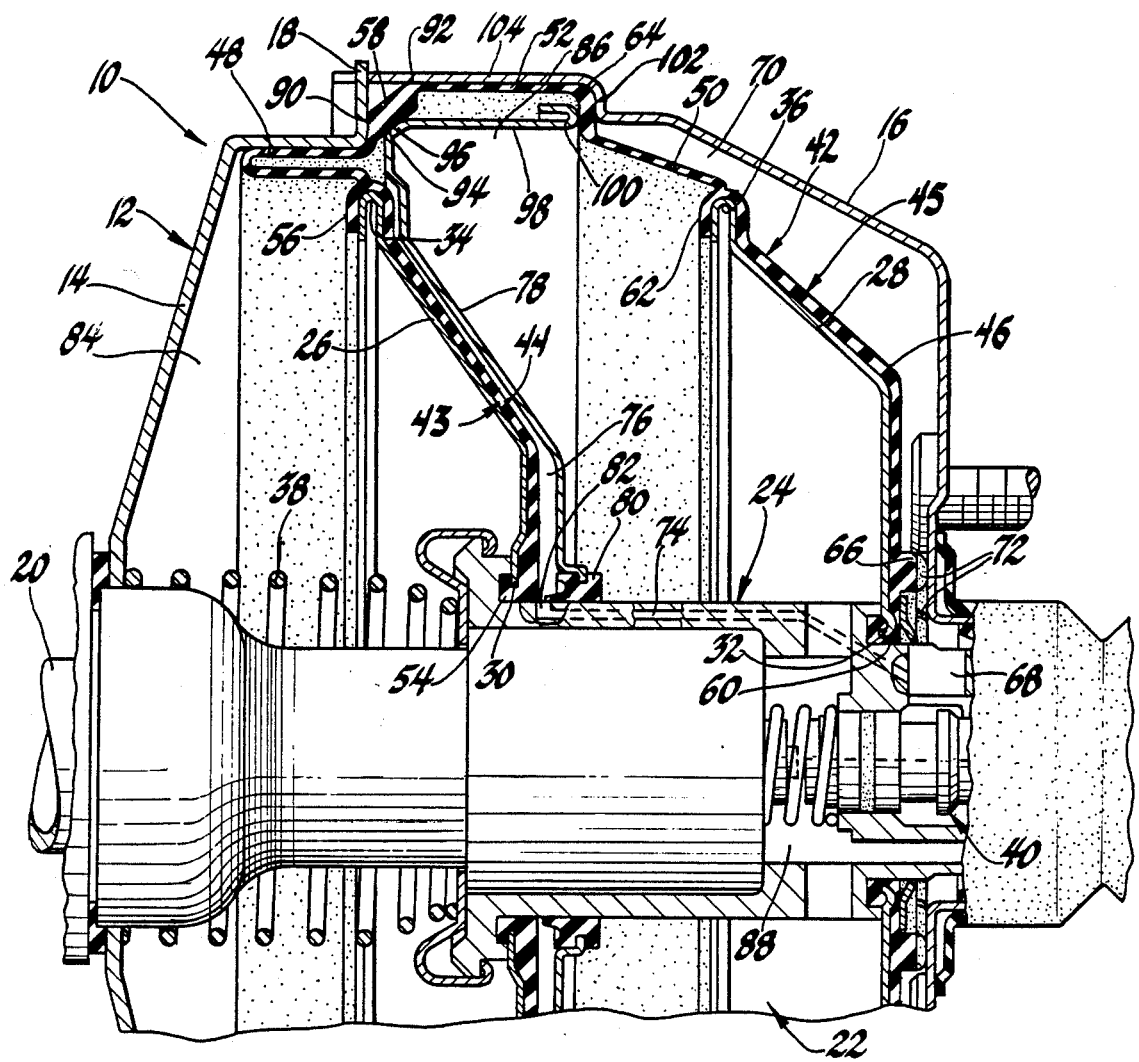
FIG. 1 is a cross-section view, with parts broken away, illustrating a tandem vacuum booster embodying the invention.

The tandem vacuum booster assembly 10 includes a booster housing 12 having a housing front section 14 and a housing rear section 16 joined at their maximum diameter outer peripheries at 18 in any suitable manner well known in the art. The booster assembly has an output member 20 suitably connected to or forming a part of a power piston assembly 22. Piston assembly 22 includes the piston 24, the front diaphragm support 26 and the rear diaphragm support 28 as well as parts of the diaphragm member described below. The diaphragm supports respectively have inner peripheries 30 and 32 and outer peripheries 34 and 36. The outer peripheries 34 and 36 are illustrated as being formed as inwardly facing channels to provide a smooth outer surface which will not damage the diaphragm material. These outer peripheries are inwardly spaced from the housing 12, and the diaphragm supports are axially movable with piston 24 in a booster actuating direction and a booster release direction as appropriate.

The booster assembly is illustrated as being in a released position. It is normally urged to this position by the power piston return spring 38. The control valve assembly 40 is received within the rear portion of piston 24 and is actuated by suitable well-known means such as a push rod and brake pedal, not shown. Since the booster assembly 10 is a vacuum suspended booster assembly, the control valve assembly is so positioned that in the released position all of the booster assembly power chambers are at the vacuum pressure normally maintained for booster purposes.

The single flexible diaphragm member 42 is the entire diaphragm means for the tandem vacuum booster assembly 10. Diaphragm member 42 includes a front supported section 44, a rear supported section 46, a front flex or roll section 48, a rear flex or roll section 50, and a connecting section 52. Thus the diaphragm member 42 may be considered to have a front diaphragm section 43 formed by diaphragm sections 44 and 48 as well as the inner peripheral bead 54, a front recessed mounting portion or bead 56 which is received about and secured to the outer periphery 34 of the front diaphragm support 26, and an outer peripheral support bead 58. Similarly, the rear diaphragm section 45 is composed of the diaphragm rear supported section 46, the rear flex or roll section 50, the inner peripheral bead 60, the rear recessed mounting portion or bead 62 which is received about and secured to the outer periphery 36 of the rear diaphragm support 28, and an outer peripheral support bead 64. The connecting section 52 is an annular circumferentially extending portion of the diaphragm member 42 and extends between and connects the front and rear outer peripheral beads 58 and 64 to join the two front and rear diaphragm sections 43 and 45 described above.

The front inner peripheral bead 54 is grooved to receive the inner periphery 30 of the front diaphragm support 26 and fits within a channel in the piston 24 so as to retain the bead 54 and the front diaphragm support 26 in position on the forward end of piston 24. The rear diaphragm inner peripheral bead 60 is somewhat similarly formed and provides a similar mounting for the inner periphery 32 of the rear diaphragm support 28. The front and rear diaphragm supports 26 and 28 and the diaphragm supported sections 44 and 46 also move with piston 24. Thus, front and rear inner peripheral beads 54 and 60, front and rear diaphragm supported sections 44 and 46, front and rear mounting beads 56 and 62, and parts of front and rear diaphragm flex or roll sections 48 and 50 are also parts of the movable piston assembly 22.

Immediately radially outward of bead 60 an annular ring 66, or in some instances a series of protrusions formed in this position, is provided which extends rearwardly for engagement with the housing rear section 16 when the booster is in the released position illustrated. If circumferentially spaced protrusions are provided, there are sufficient air passage spaces therebetween to connect valve chamber 68 with the rear variable pressure chamber 70 defined by the diaphragm rear supported section 46 and the interior of housing rear portion 16. If the annular ring 66 is provided, groove passages 72 are formed in the ring in circumferentially spaced relation to provide air passages between valve chamber 68 and the rear variable pressure chamber 70.

The piston passage 74 maintains valve chamber 68 in fluid communication with the front variable pressure chamber 76, which is defined as its inner periphery by a portion of the outer surface of piston 24 and otherwise by the rearward side of the front diaphragm section 43 and the forward side of a divider wall 78. Divider wall 78 is positioned in the booster housing 12 so that it is not axially movable with piston 24. It has an inner peripheral seal 80 which is in slidable sealing relation with the outer surface of piston 24 as the piston moves axially during booster assembly actuation and release. The forward end opening 82 of passage 74 opens into the front variable pressure chamber 76 axially intermediate the front inner peripheral bead 54 and the divider wall inner peripheral bead 80. Therefore valve chamber 68, groove passages 72, and passage 74 maintain continuous fluid communication between the front and rear variable pressure chambers 76 and 70.

Housing 12 is further divided into a front vacuum pressure chamber 84 and a rear vacuum pressure chamber 86. Chamber 84 is defined by the inner surface of the housing front section 14, the front diaphragm section 43 particularly including the diaphragm front flex or roll section 48, and the front diaphragm support 26 together with the diaphragm front supported section 44. The rear vacuum pressure chamber 86 is defined by the rear side of the divider wall 78, the forward wall of the rear diaphragm support 28, the rear diaphragm section 45, particularly including the diaphragm rear flex or roll section 50, and the diaphragm rear supported section 46, a portion of the outer surface of piston 24. Front and rear vacuum pressure chambers 84 and 86 are continually connected by passage means 88 formed in piston 24, portions of which are not shown but are well known in the art. The front vacuum pressure chamber 84 is suitably provided with vacuum pressure from a source such as the engine intake manifold through a vacuum check valve, not shown, as is well known in the art.

In the brake released position illustrated, the control valve assembly 40 provides fluid communication between the piston passage means 88 and valve chamber 68 so that all four power chambers, namely the front and rear variable pressure chambers 76 and 70 and the front and rear vacuum pressure chambers 84 and 86, are maintained at vacuum pressure. Therefore the booster is of the type known as a vacuum suspended booster.

Referring more particularly to the various seal points provided as a part of the diaphragm member 42, bead 58 is illustrated as being beveled so that it has one circumferentially extending seal point 90 engaging an outer portion of the housing front section 14, and another circumferentially extending seal point 92 engaging a portion of the housing rear section 16 so that the two seal points effectively seal the joint 18 between the two housing sections. Another circumferentially extending seal point 94 on bead 58 is on an inner side thereof and is in full circumferential sealing engagement with a cooperating circumferential section 96 of the divider wall 78. Seal point 94 permanently separates the front variable pressure chamber 76 from the rear vacuum pressure chamber 86. Divider wall 78 may have a rearwardly extending flange 98, the end 100 of which is in sealing engagement with bead 64, thus further insuring a sealing division between the front variable pressure chamber 76 and the rear vacuum pressure chamber 86. Bead 64 is also in full circumferential sealing engagement with a shoulder 102 formed as a part of housing rear section 16, and the divider wall flange 98 helps hold bead 64 in such sealing engagement. Shoulder 102 is a part of a curved corner section leading to the housing rear section outer peripheral portion 104 in engagement with the diaphragm member connecting section 52.

Figure 2:
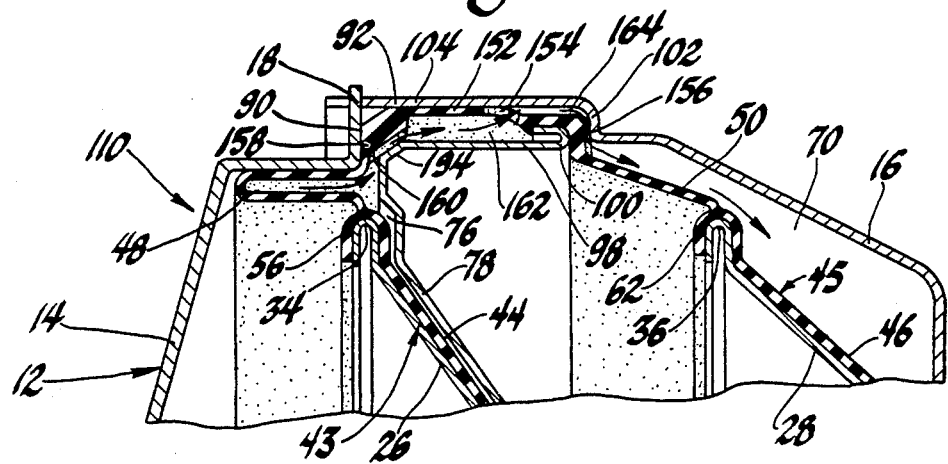
FIG. 2 is a fragmentary cross-section view of a tandem vacuum booster similar to that of FIG. 1 and having a modification thereof wherein a passage arrangement is provided for fluidly interconnecting two of the four power chambers.

The modification shown in FIG. 2 has the same basic arrangement as that of FIG. 1 with some changes being made in the area of the two diaphragm outer peripheral beads and the connecting section. The same reference numerals as used in FIG. 1 are provided in all instances where appropriate, with different reference numerals being provided only in areas having a modified construction. The outer peripheral bead 158 has groove passages 160 formed therein at seal point 194 to provide a continuous fluid connection between the front variable pressure chamber 76 and the small annular chamber 162 between the divider wall portion 98 and the housing rear section outer peripheral portion 104. A series of circumferentially spaced openings 154 formed through the diaphragm member connecting section 152 between beads 158 and 164 provide continuous fluid communication through the connecting section 152. The outer peripheral bead 164 is provided with outer groove passages 156 which provide fluid communication past that bead and the shoulder 102 of the housing rear section 16 and therefore maintains a continuous fluid communication path between the front variable pressure chamber 76 and the rear variable pressure chamber 70 as illustrated by the arrows in the drawing. For example, during brake release, air is being evacuated from chambers 76 and 70 and flows in the direction of those arrows from chamber 76 through groove passages 160, chamber 162, openings 154, groove passages 156 and chamber 70. In this arrangement the passage 74 in piston 24 as shown in FIG. 1 is no longer required.

It can be seen that a single diaphragm member has been provided instead of pair of diaphragm members and various inner and outer peripheral seals, simplifying parts proliferation and handling and providing appropriate sealing points as needed.

The embodiments of the invention in which an exclusive property or privilege is claimed are defined as follows:

1. In a tandem vacuum booster having a booster housing defined by a housing front section and a housing rear section and divided into a front booster section and a rear booster section by a divider wall, an annular front diaphragm support and an annular rear diaphragm support mounted on a movable booster piston at their inner peripheries, diaphragm means dividing said front booster section into a front vacuum chamber and a front variable pressure chamber and said rear booster section into a rear vacuum chamber and a rear variable pressure chamber, first passage means providing continuous fluid communication between said front and rear vacuum chambers, second passage means providing continuous fluid communication between said front and rear variable pressure chambers, and valve means controlling the pressure value in the variable pressure chambers to actuate and release the vacuum booster, said diaphragm means being a single flexible diaphragm member comprising:

a front diaphragm section having a beaded front inner periphery secured to said booster piston adjacent said front diaphragm support, a front supported section in supported relation with said front diaphragm support, a recessed front mounting portion secured to the outer periphery of said front diaphragm support, a front outer peripheral support bead in sealing engagement with said front and rear booster housing sections and said divider wall, and a front roll section extending between said recessed front mounting portion and said outer peripheral support bead and folded into rolling engagement with said booster housing front section;

a rear diaphragm section having a beaded rear inner periphery secured to said booster piston adjacent said rear diaphragm support, a rear supported section in supported relation with said rear diaphragm support, a recessed rear mounting portion secured to the outer periphery of said rear diaphragm support, a rear outer peripheral support bead in sealing engagement with said rear booster housing section and said divider wall, and a rear roll section extending between said recessed rear mounting portion and said rear outer peripheral support bead and foldable into rolling engagement with a portion of said divider wall as said booster is actuated;

and a circumferentially extending annular connecting section extending between and connecting said front and rear outer peripheral support beads and sealingly engaged with at least a circumferentially extending annular portion of said booster housing rear section radially outward of said divider wall.

2. In a tandem vacuum booster having a booster housing defined by a housing front section and a housing rear section and divided into a front booster section and a rear booster section by a divider wall, an annular front diaphragm support and an annular rear diaphragm support mounted on and secured to a movable booster piston at their inner peripheries, diaphragm means dividing said front booster section into a front vacuum chamber and a front variable pressure chamber and said rear booster section into a rear vacuum chamber and a rear variable pressure chamber, first passage means providing continuous fluid communication between said front and rear vacuum chambers, second passage means providing continuous fluid communication between said front and rear variable pressure chambers, and valve means controlling the pressure value in the variable pressure chambers to actuate and release the vacuum booster, said diaphragm means being a single flexible diaphragm member comprising:

a front diaphragm section having a beaded front inner periphery secured to said booster piston adjacent said front diaphragm support, a front supported section in supported relation with said front diaphragm support, a recessed front mounting portion secured to the outer periphery of said front diaphragm support, a front outer peripheral support bead in sealing engagement with said front and rear booster housing sections and said divider wall, and a front roll section extending between said recessed front mounting portion and said outer peripheral support bead and folded into rolling engagement with said booster housing front section;

a rear diaphragm section having a beaded rear inner periphery secured to said booster piston adjacent said rear diaphragm support, a rear supported section in supported relation with said rear diaphragm support, a recessed rear mounting portion secured to the outer periphery of said rear diaphragm support, a rear outer peripheral support bead in sealing engagement with said rear booster housing section and said divider wall, and a rear roll section extending between said recessed rear mounting portion and said rear outer peripheral support bead and foldable into rolling engagement with a portion of said divider wall as said booster is actuated;

and a circumferentially extending annular connecting section extending between and connecting said front and rear outer peripheral support beads and in circumferential sealing engagement with at least a circumferentially extending annular portion of said booster housing rear section radially outward of the divider wall;

said connecting section having openings formed therethrough and said front and rear support beads having groove passages formed therein so that said front and rear variable pressure chambers are in continuous fluid flow and pressure communication, said groove passages and said connecting section openings defining parts of said second passage means.

3. For use in a tandem vacuum booster having a booster housing defined by a housing front section and a housing rear section and divided into a front booster section and a rear booster section by a divider wall, an annular front diaphragm support and an annular rear diaphragm support mounted on and secured to a movable booster piston at their inner peripheries, diaphragm means dividing said front booster section into a front vacuum chamber and a front variable pressure chamber and said rear booster section into a rear vacuum chamber and a rear variable pressure chamber, first passage means providing continuous fluid communication between said front and rear vacuum chambers, second passage means providing continuous fluid communication between said front and rear variable pressure chambers, and valve means controlling the pressure value in the variable pressure chambers to actuate and release the vacuum booster:

a single flexible diaphragm member defining diaphragm means adapted to be used in said tandem vacuum booster and comprising:

a front diaphragm section having a beaded front inner periphery adapted to be secured to the booster piston adjacent the front diaphragm support, a front supported section adapted to be in supported relation with the front diaphragm support, a recessed front mounting portion adapted to be secured to the outer periphery of the front diaphragm support, a front outer peripheral support bead adapted to be in sealing engagement with the front and rear booster housing sections and the divider wall, and a front roll section extending between said recessed front mounting portion and said front outer peripheral support bead and adapted to be folded into rolling engagement with the booster housing front section;

a rear diaphragm section having a beaded rear inner periphery adapted to be secured to the booster piston adjacent the rear diaphragm support, a rear supported section adapted to be in supported relation with the rear diaphragm support, a recessed rear mounting portion adapted to be secured to the outer periphery of the rear diaphragm support, a rear outer peripheral support bead adapted to be in sealing engagement with the rear booster housing section and the divider wall, and a rear roll section extending between said recessed rear mounting portion and said rear outer peripheral support bead and adapted to be foldable into rolling engagement with a portion of the divider wall as the booster is actuated;

and an annular connecting section extending between and connecting said front and rear outer peripheral support beads and adapted to be sealingly engaged with the booster housing rear section radially outward of the divider wall.

* * * * *